United States Patent
Tortora et al.

[11] Patent Number: 6,026,711
[45] Date of Patent: Feb. 22, 2000

[54] HARMONIC DRIVE BEARING ARRANGEMENT

[75] Inventors: Carmine Gabriel Tortora, Lowell, Mass.; Robert P. Lascelles, York, Me.; Kenji Tejima, Hisai, Japan; Joseph John Aubin, Georgetown, Mass.

[73] Assignee: Harmonic Drive Technologies, Peabody, Mass.

[21] Appl. No.: 09/150,883

[22] Filed: Sep. 10, 1998

[51] Int. Cl.[7] .................................................. F16H 1/00
[52] U.S. Cl. ............................................. 74/640; 384/512
[58] Field of Search .............................. 74/640; 384/512

[56] References Cited

U.S. PATENT DOCUMENTS

| | | | |
|---|---|---|---|
| 3,482,770 | 12/1969 | Nelson | 74/640 |
| 4,518,308 | 5/1985 | Grzybowski et al. | 74/640 |
| 4,625,582 | 12/1986 | Kiryu | 74/640 |
| 4,951,518 | 8/1990 | Hendershot | 74/640 |
| 5,850,765 | 12/1998 | Shirasawa | 74/640 |

FOREIGN PATENT DOCUMENTS

| | | | |
|---|---|---|---|
| 61-270537 | 11/1986 | Japan | 74/640 |
| 459626 | 3/1975 | U.S.S.R. | 74/640 |
| 1605057 | 11/1990 | U.S.S.R. | 74/640 |
| 1740824 | 6/1992 | U.S.S.R. | 74/640 |
| 1747769 | 7/1992 | U.S.S.R. | 74/640 |

*Primary Examiner*—Khoi Q. Ta
*Attorney, Agent, or Firm*—Don Halgren

[57] ABSTRACT

The present invention comprises a novel harmonic drive transmission arrangement having an input member and an output member, and its method of manufcature. The transmission comprises a generally cylindrically-shaped housing including a circular spline gear arranged therein, and a cup-shaped flexspline with an array of radially outwardly directed gear teeth on a first end thereof, engaged with the circular spline teeth. A wave generator is rotatably supported on the input member radially inwardly of the gear on the flexspline. An annular diaphragm is arranged at a second end of the cup-shaped flexspline, and a flange is attached or integral to the diaphragm to permit the cup-shaped flexspline to be securely attached to the output member, the flange having a annular outmost surface thereon. An outer bearing race is attached to a second end of the housing, and an arrangement of bearing members are arranged between the outer bearing race and the radially outermost surface of the flange, the bearing members between rotatable radially about said radially outer surface of the flange, in a structurally supportive manner therewith.

10 Claims, 2 Drawing Sheets

HARMONIC DRIVE BEARING ARRANGEMENT

BACKGROUND OF THE INVENTION

1. Field of the Invention

This invention relates to harmonic drive transmissions and more particularly to a supportive bearing arrangement on that harmonic drive transmission unit.

2. Prior Art

Harmonic drive transmissions were originally called "strain wave gearing", and were initially introduced by Musser in U.S. Pat. No. 2,906,143. Such original harmonic drive transmissions or "strain wave gearing" comprised a rigid, circular spline having "N" teeth. A flexspline having fewer than "N" teeth ("N" being a positive integer) and being disposed within the circular spline, and a rotatable wave generator disposed within the flexspline to deform the flexspline into a lobed configuration, such as an oval shape, so as to force the flexspline into engagement with the circular spline at two points on the major axis of the formed ovaloid.

The wave generator may include an oval cam plate and a bearing snuggly mounted on the outer periphery of the cam plate. The outer bearing is matingly inserted into the flex spline to as to deform it to the peripheral contour of the cam plate. An input shaft attached to the cam plate provides rotation thereto, causing the ovaloid configuration of the flexspline to be correspondingly rotated. During such rotation, the circular spline is induced to rotate, relative to the flexspline, in an amount proportional to the difference in the number of teeth between the flexspline and the circular spline. When an output shaft is arranged on either the flexspline or the circular spline, that output shaft is rotated very slowly in comparison to its input shaft. Such harmonic drive, strain wave gearing, has been utilized in machinery requiring a high reduction ratio.

The flexsplines are generally cup shaped, having an open first end and a closed second end. The closed second end usually comprises a diaphragm having a central, generally circular boss thereon. The boss may comprise a thickened portion of the diaphragm, as for example may be seen in U.S. Pat. No. 5,269,202 to Kiyosawa et al. The diaphragm radially outwardly of the boss disclosed in this patent decreases in thickness as it extends radially outwardly from that boss. This flexspline will be bolted to a hub for transmission of rotary motion therebetween. A shaft is typically connected via a circular bolting pattern to the boss. The shaft itself is then supported within an annular bearing arrangement disposed between the shaft and an annular housing enclosing the flexspline cup and wave generator. The alignment requirements for such a bearing arrangement in conjunction with the attachment to the boss, requires high tolerance machining and extended assembly.

It is an object of the present invention, to provide a harmonic drive assembly which improves over the prior art.

It is a further object of the present invention, to provide a harmonic drive assembly which is less expensive to manufacture by virtue of fewer parts and by virtue of elimination of possible misalignment inherent in prior art devices.

It is yet a still further object of the present invention, to provide a harmonic drive assembly utilizing a bearing arrangement which minimizes assembly time and improves the performance of the harmonic drive unit.

BRIEF SUMMARY OF THE INVENTION

The present invention comprises a harmonic drive transmission utilized in providing a high ratio of input to output rotary motion. Harmonic drive transmission generally comprises a housing of generally cylindrical shape. The housing has a first end and a second end. The first end of the housing has a circular opening thereat, comprising an inwardly directed circular spline toothed gear arrangement. The circular spline has "N" teeth therein. A generally cup-shaped flexspline is rotatably disposed within the housing. The flex spline has a first end which is open, and has a flexible outer lip having an array of radially outwardly directed teeth thereon, of fewer than "N" teeth in number. A power input shaft is rotatably disposed into the first end of the housing, for transmission of rotary motion into the harmonic drive transmission assembly.

A noncircular or generally oval-shaped wave generator, having at least two diametrically opposed lobes along its outer periphery, is disposed radially about the input shaft, and radially inwardly of the flexspline teeth. A bearing assembly is disposed between the outer peripheral surface of the wave generator, and the radially inwardmost surface of the first end of the flexspline cup.

The flexspline cup has a second end, which is disposed within the second end of the housing. The flexspline cup has a diaphragm extending radially inwardly from its outermost edges at its second end. The diaphragm, at the second end of the flexspline is tapered to an increasing thickness radially inwardly. The radially inwardmost end of the tapered diaphragm is uniformly configured as a radially inwardly directed notch or generally "U" shaped channel of annular orientation. The channel has a radially outwardly extending flange defining a second side thereof. The first side of the generally "U" shaped notch or channel is defined by the diaphragm which is preferably tapered.

The flange defining the second side of the generally "U" shaped notch or channel as a plurality of bolt holes circularly spaced therearound. The bolt holes are spaced at an enlarged radius (in axial alignment with the diaphragm), to permit the greatest number of bolts to be used therewith, for an attachment to an output member, thereby providing greater support between the upper member and the flex spline cup. The flange itself is defined by two parallel walls, each of which are preferably perpendicular to the axis of rotation of the flexspline cup. The flange has an outer peripheral surface of annular configuration having a diameter approximately equal to that of the flexspline cup.

A pair of split rings, which together define an outer bearing race, are bolted together to the second end of the housing. In a first preferred embodiment, the annular peripheral surface defining the annular radially outermost surface of the flange, may have shallow circumferentially arranged grooves thereon. An arrangement of bearing members, for example, ball bearings, or roller bearings or the like, are arranged between the outer race and the outermost peripheral surface of the flange, the bearing members riding directly thereon. In that first preferred embodiment of the bearing members, those bearing members may comprise ball bearings, and those ball bearings may ride in the shallow angularly arranged grooves configured on the outer peripheral surface of the flange.

By virtue of using the outer peripheral surface of the flange as the inner race itself, one or more transmission assembly parts are eliminated which would otherwise have to be manufactured and assembled, according to high tolerance requirements. By utilizing the bearings between the outer race and the flange directly on the flexspline portion of the harmonic drive itself permits the actual rotative bearing members, whether they are balls or roller bearings, become the direct supporting structure of the rotative flexspline components of the harmonic drive unit. They are connected directly to the housing through those support bearings. Thus, by eliminating the inner bearing race(s), the harmonic drive assembly weight may be minimized and size may be minimized, to produce a more cost-efficient, more compact harmonic drive unit. The bearing members themselves may be held in place by a bearing member cage, which permits the bearing members to be pressed onto the peripheral surface of the flange, and radially within the outermost outer bearing race which is bolted in place against the housing, thus capturing the bearing members rotatably therebetween.

A second preferred embodiment includes the use of an inner race which is press fit directly onto the outer periphery of the flange axially adjacent the diaphragm of the flexspline. The bearing members, ball bearings or roller bearings, are then also in radial alignment with the flange immediately adjacent the flexspline diaphragm, in a manner similar to those of the previous embodiment, to provide improved rotational stability of the flexspline/diaphragm not found in the art. By being press fit onto the flange, the bearing members, which includes an inner bearing race, minimizes the machining costs by removing the need to have to mill the flange, which in one embodiment of this invention, is integral with the flexspline. Dowel pins and precision dowel pin holes are eliminated by such a construction, which pins are required for component alignment in the prior art.

The invention thus comprises a harmonic drive transmission arrangement having an input member and an output member, the transmission comprises a generally cylindrically-shaped housing including a circular spline gear arranged therein, and a cup-shaped flex spline with an array of radially outwardly directed gear teeth on a first end thereof, engaged with the circular spline teeth. A wave generator is rotatably supported on the input member radially inwardly of the gear on the flex spline. An annular diaphragm is arranged at a second end of the cup-shaped flexspline, and a flange may be integral or attached to the diaphragm to permit the cup-shaped flexspline to be securely attached to the output member, the flange having an annular outmost surface thereon. An outer bearing race is attached to a second end of the housing, and an arrangement of bearing members are arranged between the outer bearing race and the radially outermost surface of the flange, the bearing members being between rotatable in one embodiment directly on the radially outer surface of the flange, in a structurally supported manner therewith. The flange in a second embodiment may have an inner bearing race to support the bearings in the flange. The flange may be attached to the diaphragm end of the flexspline cup, or the flange may be an integral part of the flexspline cup. A "U" shaped channel is annularly arranged between the diaphragm and the flange. The radially outermost annular surface of the flange, may have a shallow groove arranged annularly thereon. The outer bearing races, may be comprised of a pair of split rings having curvilinear inner surfaces to define an inner race surface onto which the bearing members may revolve.

The invention also comprises a method of securely transmitting a reduced ratio of rotary power of an input member to an output member through a harmonic drive transmission arrangement comprising the steps of: supporting a flexspline within a generally cylindrically-shaped housing, the housing including a circular spline gear arranged therein, and a cup-shaped flexspline with an array of radially outwardly directed gear teeth on a first end thereof, engaged with the circular spline teeth; arranging a wave generator rotatably supported on the input member radially inwardly of the gear teeth on the flexspline; forming an annular diaphragm arranged at a second end of the cup-shaped flexspline; arranging a flange on the diaphragm, the flange having an annularly-shaped radially outermost surface; attaching an outer bearing race to the housing radially outwardly of the flange; and inserting an arrangement of bearing members to revolve directly on the radially outermost surface of the flange, and radially within the outer bearing race, so as to directly support the flange within the housing. The method may include the step of: manufacturing the flange integral with the diaphragm on the second end of the flexspline cup. The method may include the radially outermost surface of the flange having an annular groove disposed therearound for the bearing members to ride thereon.

BRIEF DESCRIPTION OF THE DRAWING

The objects and advantages of the present invention will become more apparent, when viewed in conjunction with the following drawings, in which.

DESCRIPTION OF THE PREFERRED EMBODIMENTS

Figure 1:
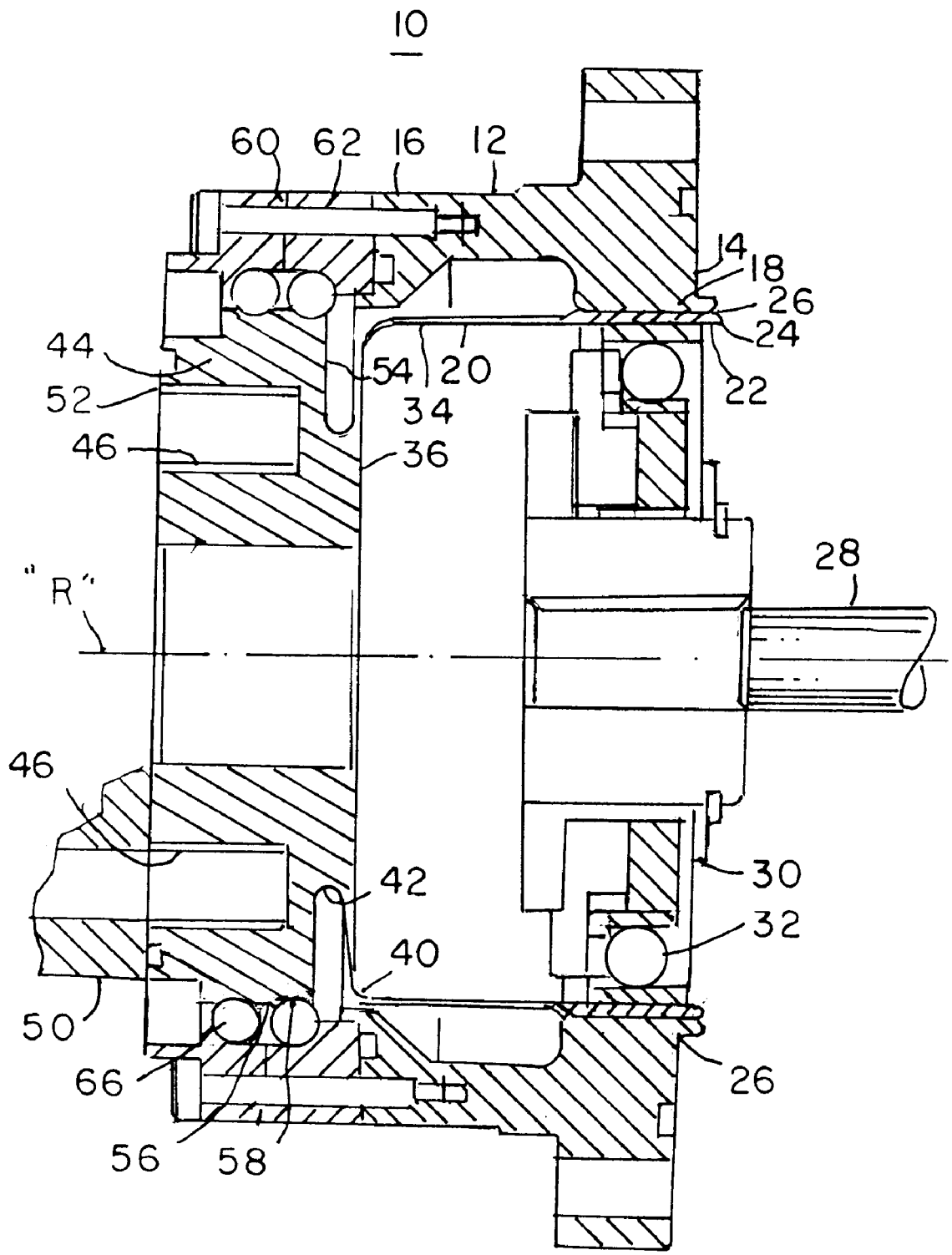
FIG. 1 is a side-elevational view of a harmonic drive transmission constructed according to the principles of the present invention.

Referring now to the drawings in detail, and particularly to FIG. 1, there is shown the present invention which comprises a side elevational view, in section, of a harmonic drive transmission 10 typically utilized in providing a high ratio of input to output rotary motion. The harmonic drive transmission 10 generally comprises a housing 12 of generally cylindrical shape. The housing 12 has a first end 14 and a second end 16. The first end 14 of the housing 12 has a circular opening thereat, comprising an inwardly directed circular spline toothed gear arrangement 18. The circular spline 18 has "N" radially inwardly directed teeth therein. A generally cup-shaped flexspline 20 is rotatably disposed within the housing 12. The flexspline 20 has a first end 22 which is open, and has a flexible outer lip 24 having an array of radially outwardly directed teeth 26 thereon, of fewer than "N" teeth in number. A power input shaft 28 is rotatably disposed into the first end 14 of the housing 12, for transmission of rotary motion into the harmonic drive transmission assembly 10.

A noncircular or generally oval-shaped wave generator 30, having at least two diametrically opposed lobes (not shown for convenience) along its outer periphery, is disposed radially about the input shaft 28, and radially inwardly of the flexspline teeth 26. A bearing assembly 32 is disposed between the outer peripheral surface of the wave generator 30, and the radially inwardmost surface of the first end 22 of the flexspline cup 20.

The flexspline cup 20 has a second end 34, which is disposed within the second end 16 of the housing 12. The flexspline cup 20 has a diaphragm 36 extending radially inwardly from its outermost edges at its second end 40. The diaphragm 36, at the second end 40 of the flexspline cup 20 is tapered to an increasing thickness radially inwardly. The radially inwardmost end of the tapered diaphragm 36 is uniformly configured as a radially inwardly directed notch or generally "U" shaped channel 42 of annular orientation. The channel 42 has a radially outwardly extending flange 44 defining a second side thereof. The first side of the generally "U" shaped notch or channel 42 is defined by the diaphragm 36 which is preferably tapered.

The flange 44 defining the second side of the generally "U" shaped notch or channel 42 has a plurality of bolt holes 46 circularly spaced therearound. The bolt holes 46 are spaced at an enlarged radius (in axial alignment with the diaphragm), to permit the greatest number of bolts to be used therewith, for an attachment to an output member 50, thereby providing greater support between the output member 50 and the flexspline cup 20. The flange 44 itself is defined by two parallel walls 52 and 54, each of which are preferably perpendicular to the axis of rotation "R" of the flexspline cup 20. The flange 20 has an outer peripheral surface 56 of annular configuration having a diameter approximately equal to that of the flexspline cup 20.

The annular peripheral surface 56 defining the annular radially outermost surface of the flange 44 may have shallow circumferentially arranged grooves 58 thereon. A pair of split rings 60 and 62, which together define an outer bearing race, are bolted together to the second end 16 of the housing 12. An arrangement of bearing members 66, for example, ball bearings, or roller bearings or the like, are arranged between the rings 60 and 62 comprising the outer race and the outermost peripheral surface 56 of the flange 44, the bearing members 66 riding directly on that annular surface 66. In one preferred embodiment, in which those bearing members 66 comprise ball bearings, the ball bearings may ride in the shallow angularly arranged grooves 58 configured on the outer peripheral surface 56 of the flange 44.

By virtue of using the outer peripheral surface 56 of the flange 44 acting as the inner race itself, one or more transmission assembly parts are eliminated which would otherwise have to be manufactured and assembled, according to high tolerance requirements. By utilizing the bearings 66 between the outer race rings 60 and 62 and the flange 44 directly on the flexspline cup 20 portion of the harmonic drive assembly 10 itself permits the actual rotative bearing members 66, whether they are balls or roller bearings, to become the direct supporting structure of the rotative flexspline components (20 and 44) of the harmonic drive unit 10. They are connected directly to the housing 12 through those support bearing members 66. Thus, by eliminating the inner bearing race(s), the harmonic drive assembly weight may be minimized and size may be minimized, to produce a more cost-efficient, more compact harmonic drive unit. The bearing members themselves may be held in place by a bearing member cage (not shown), which permits the bearing members 66 to be pressed onto the peripheral surface 56 of the flange 44, and radially within the outermost outer bearing race ring components 60 and 62 which components 60 and 82 are bolted in place against the second end 16 of the housing 12, thus capturing the bearing members 66 rotatably therebetween.

Figure 2:
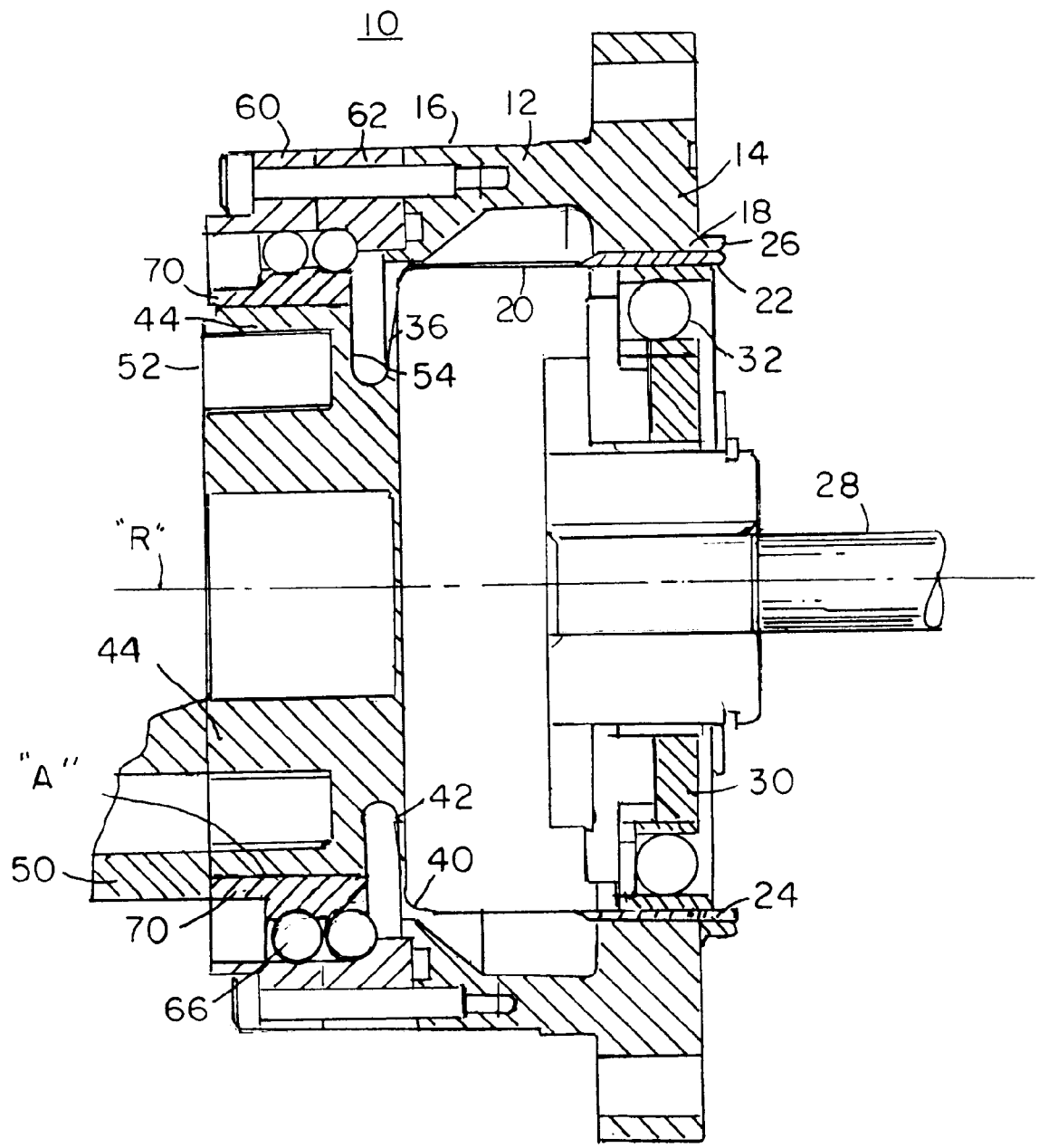
FIG. 2 is a side elevational view of a harmonic drive transmission, in a further embodiment to that shown in FIG. 1.

A second preferred embodiment, as shown in FIG. 2, includes the use of an inner race 70 which is "press-fit" directly onto the outer periphery 72 of the flange 44 axially adjacent the diaphragm 36 of the flexspline cup 20. Such inner race 70 may be further secured to the flange 44 by application of an adhesive "A" between the flange 44 and the inner bearing race 70. The bearing members 66, ball bearings or roller bearings, are then also in radial alignment with the flange 44 immediately adjacent the flexspline diaphragm 36, in a manner similar to those of the previous embodiment, to provide improved rotational stability of the flexspline and diaphragm 20 and 36, not found in the art.

By virtue of the bearing inner race 70 being press fit onto the outer surface 72 of the flange 44, the machining costs are minimized by virtue of removing the need to have to further mill a complicated and delicate component such as the flange 44, which in one embodiment of this invention, is integral with the flexspline 20. Prior art components such as dowel pins and precision dowel pin holes are eliminated by such a construction, which pins are required for flexspline alignment in the prior art.

Thus what has been shown is a novel construction of bearing support arranged directly onto a portion of a harmonic drive flexspline which permits simpler construction, minimizes costs and reduces rotational inaccuracies of the flexspline cup and its shafts connected therewith. The "press-fit" assembly of an inner race in one embodiment of the present invention aides in reducing manufacturing costs and improves performance in a manner not shown or suggested by such prior art.

We claim:

1. A harmonic drive transmission arrangement having an input member and an output member, said transmission comprising:

a generally cylindrically-shaped housing including a circular spline gear arranged therein, and a cup-shaped flexspline with an array of radially outwardly directed gear teeth on a first end thereof, engaged with said circular spline teeth;

a wave generator rotatably supported on said input member radially inwardly of said gear on said flexspline;

an annular diaphragm arranged at a second end of said cup-shaped flexspline;

a flange on said diaphragm to permit said cup-shaped flexspline to be securely attached to said output member, said flange having a annular outmost surface thereon;

an outer bearing race attached to a second end of said housing; and an arrangement of bearing members arranged between said outer bearing race and said radially outermost surface of said flange, said bearing members between rotatable radially outwardly of and riding directly on said radially outer surface of said flange, to support said flange thereby.

2. The harmonic drive transmission arrangement as recited in claim 1, wherein said flange is integral with said diaphragm end of said cup.

3. The harmonic drive transmission arrangement as recited in claim 1, wherein the said flange is an integral part of said flexspline.

4. The harmonic drive transmission arrangement as recited in claim 2, including a "U" shaped channel annularly arranged between said diaphragm and said flange.

5. The harmonic drive transmission arrangement as recited in claim 1, wherein said radially outermost annular surface of said flange, has a groove arranged annularly thereon for said bearings.

6. The harmonic drive transmission arrangement as recited in claim 2, wherein said outer bearing races, are comprised of a pair of split rings having curvilinear inner surfaces to define an outer race surface against which said bearing members may revolve.

7. A method of securely transmitting a reduced ratio of rotary power of an input member to an output member through a harmonic drive transmission arrangement comprising the steps of:

supporting a flexspline within a generally cylindrically-shaped housing, said housing including a circular spline gear arranged therein, and a cup-shaped flexspline with an array of radially outwardly directed gear teeth on a first end thereof, engaged with said circular spline teeth;

arranging a wave generator rotatably supported on said input member radially inwardly of said gear teeth on said flexspline;

forming an annular diaphragm arranged at a second end of said cup-shaped flexspline;

arranging a flange on said diaphragm, said flange having an annularly-shaped radially outermost surface;

attaching an outer bearing race to said housing radially outwardly of said flange; and inserting an arrangement of bearing members to revolve between said radially outermost surface of said flange and said outer bearing race, for said bearings to ride directly upon said outermost surface of said flange, so as to directly support said flange within said housing.

8. The method as recited in claim 7, including the step of:

manufacturing said flange integral with said diaphragm on said second end of said flex spline cup.

9. The method as recited in claim 7, wherein said radially outermost surface of said flange has an annular groove disposed therearound for said bearing members to ride thereon.

10. The method as recited in claim 9, including the step of:

applying a layer of adhesive to said outer periphery of said flange prior to said press-fitting of said inner bearing race thereon.

* * * * *